Nov. 25, 1924.

L. J. OLSON 1,516,545

GRAIN SAVING ATTACHMENT

Filed March 1, 1922

WITNESSES

INVENTOR
L. J. OLSON,

BY

ATTORNEYS

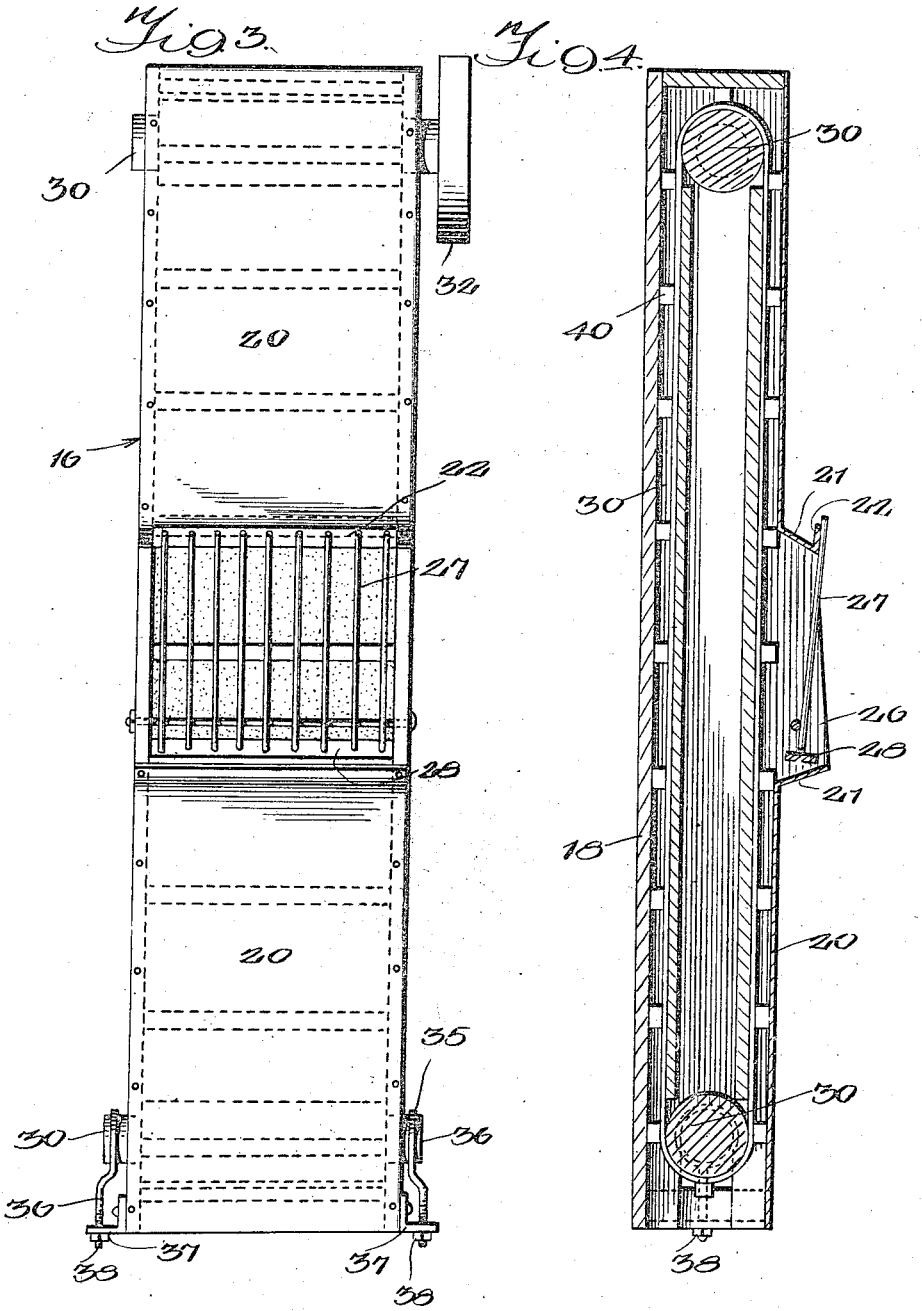

Patented Nov. 25, 1924.

1,516,545

UNITED STATES PATENT OFFICE.

LARS JOHAN OLSON, OF TROSKY, MINNESOTA.

GRAIN-SAVING ATTACHMENT.

Application filed March 1, 1922. Serial No. 540,144.

*To all whom it may concern:*

Be it known that I, LARS J. OLSON, a citizen of the United States, and a resident of Trosky, in the county of Pipestone and State of Minnesota, have invented certain new and useful Improvements in Grain-Saving Attachments, of which the following is a specification.

This invention relates to grain saving attachments especially adapted for application to thrashing machines, rice-threshers, clover-hullers, and shredders.

Briefly stated, the invention forming the subject matter of this application is strictly in the nature of an attachment for a grain and seed thrasher and hullers and shredders and is adapted to be applied to the blower housing or at the point at which many thrashers have a clean out door, the clean out door in this case being removed to permit of the attachment of the grain saver.

An important object of the improved grain saving device is to regain the stray kernels of grain which sometimes get through the machine and stacker due to careless operation of the machine. Improper regulation of the blast, undue speed, faulty adjustments or careless hand feeding are some causes of the passage of the stray kernels to the stacker and by the use of this invention these stray kernels of grain are regained.

Further the invention aims to provide a grain saving attachment for thrashing machines, hullers and shredders which is reliable in use, of highly simplified construction and one which does not require attention by the operator of the machine.

Other objects and advantages of the invention will be apparent during the course of the following description.

In the drawing:—

Figure 3 is a plan view of the attachment.

Figure 4 is a vertical longitudinal sectional view through the attachment.

Figure 1:
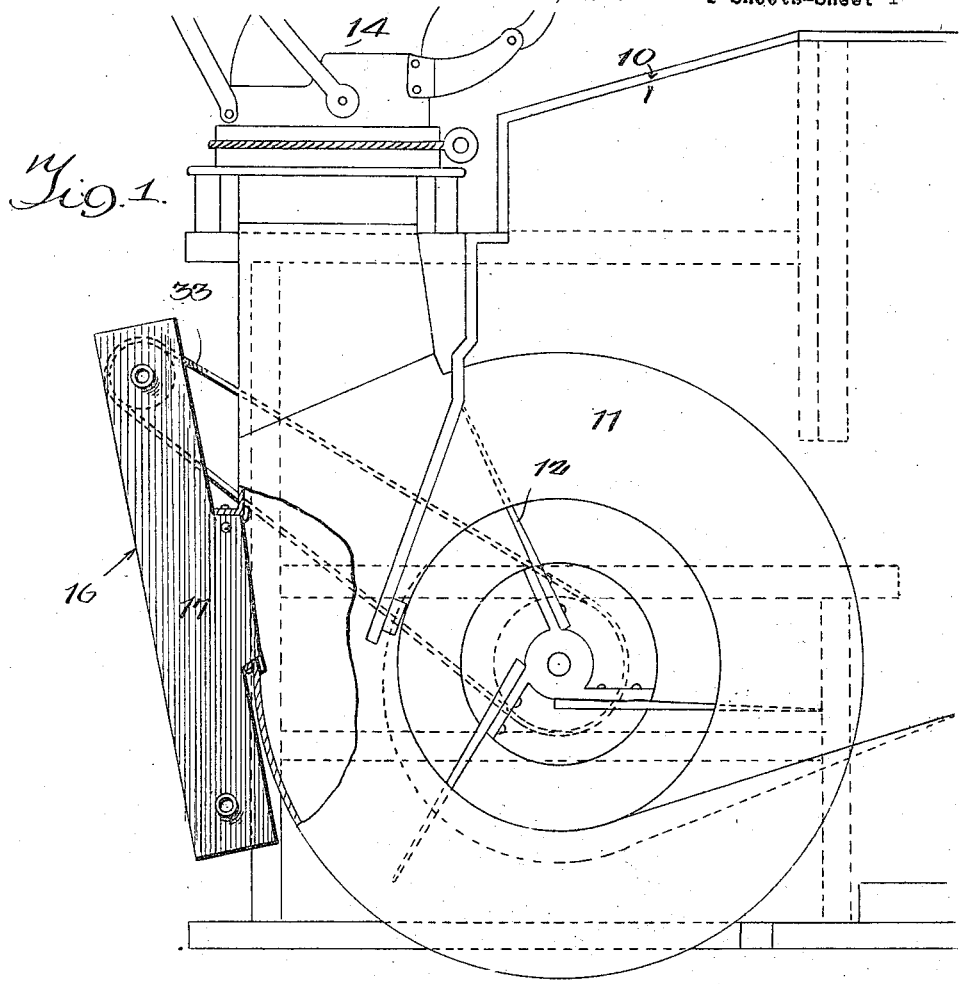
Figure 1 is a side elevation of the improved grain saving attachment applied.

In the drawing wherein for the purpose of illustration is shown a preferred embodiment of the invention the numeral 10 generally designates a grain thrasher provided with the usual fan housing 11 within which a fan 12 is located, the said fan being adapted to create a draft of air so that the straw and chaff will be conveyed out through a tube to stack 14 onto the strawstack. The thrasher or machine to which the improved grain saving device is applied may be of standard construction and the fan housing 11 is provided with an opening in one vertical side over which a cleanout door is detachably secured.

In carrying out the invention the improved grain saving device is applied to the fan housing at the point at which the cleanout door was formerly secured and if there was no cleanout door applied to the fan housing an opening may be conveniently made in the fan housing.

Figure 2:
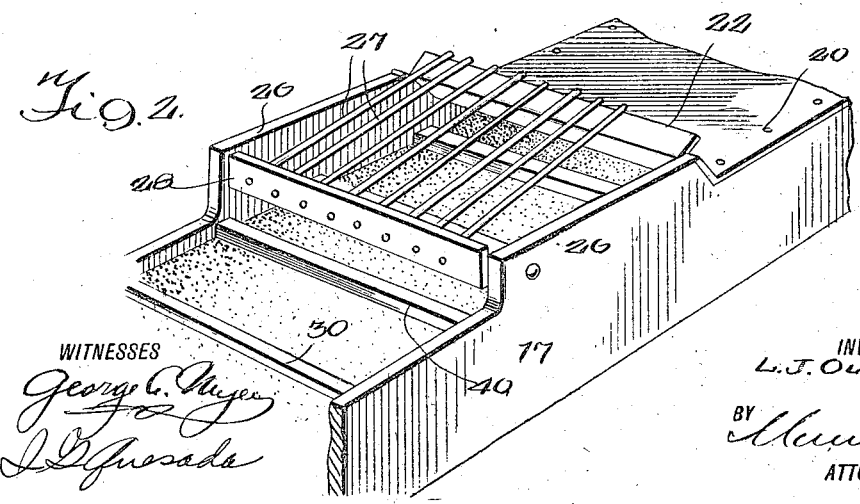
Figure 2 is a perspective of a portion of the attachment.

The improved grain saving device consists of a casing 16 of elongated formation, the said casing being provided with spaced parallel sides 17, a back 18 and a metallic cover plate 20. The metallic top plate 20 is formed in two sections and is extended outwardly as indicated at 21 and is then bent upon itself to provide an attaching flange 22 which, as illustrated in Figure 1 is extended upwardly into the fan housing and engages the inner side of the fan housing so that straw and chaff will move along its inner side of the flange 22 and thereby continue out through the tube 14. In other words the flange 22 overlaps the upper end of the opening in the fan housing 11 and thereby prevents the straw and chaff from being obstructed in its travel through the tube or stacker 14. As illustrated in Figures 1 and 2 the side walls 17 are provided intermediate their ends with lateral projections 26 which are extended into the opening in the fan housing and form a mouth for receiving the thrashed and unthrashed grain which by reason of the faulty operation of the machine passes through the fan housing. It will be noted that the blades of the fan 12 direct the straw, chaff, thrashed and unthrashed grain directly into the mouth of the grain saving attachment so that the smaller and solid particles such as the grain pass into the attachment while the straw and chaff continue their movement out through the tube.

A grate is arranged at the mouth of the attachment and consists of a plurality of parallel grate bars 27 arranged in spaced relation so as to define openings through which thrashed and unthrashed grain may freely pass. The several grate bars 27 have connection with a bar 28 which is extended across the mouth of the grain saver and secured in position by any suitable means.

The casing 16 is inclined somewhat so that the grate will also be inclined whereby the thrashed and the unthrashed grain may pass through the grate upon striking the same. However, the inclination of the grate may be varied to meet the various conditions under which the machine operates and if desired the grate may be changed for one of a different size to operate in connection with different materials.

A conveyor designated by the numeral 30 is arranged within the casing 16 and is mounted upon drums 30 arranged at the ends of the casing and rotatably extends through the same. The drum 30 at one end of the casing may be provided with a pulley wheel 32 about which an operating belt 33 is extended so that the conveyor 30 which is continuous will be moved about the several drums 30.

The lower drum 30 is provided with journals which rotatably extend through bearing members 35 having threaded stems 36 passed through brackets 37 and held in position by means of adjusting nuts 38. By means of the nut 38 the tension on the conveyor may be readily and conveniently regulated by the operator.

The principle advantage residing in the tensioning means for the conveyor is the fact that the rubber covered slats 40 or slats covered with other suitable material which extend across the conveyor are forced into air tight engagement with the front and back walls of the casing 16. By thus providing an air tight connection between the casing and the conveyor the escape of the draft of air created by the fan 12 is prevented.

In operation the force of the blast of air created by the fan blows the material passing through the fan casing directly onto the grate and any thrashed or unthrashed grain which may be in this material is passed through the grate and discharged onto the conveyor. The material thus discharged onto the conveyor which is carried by the same to the open lower end of the conveyor and may be returned by means of an auger to the tailings elevator of the machine or can be used with a recleaner.

Also if desired the material passed out through the conveyor may be put into a suitable container as may be desired by the operator.

The grate or grain trap may be made single or in series, and adjustable with or without deflectors and to suit the various kinds and conditions of grain and seed to be thrashed or hulled.

With reference to the foregoing description taken in connection with the accompanying drawing, it will be seen that a grain saving attachment constructed in accordance with this invention may be readily and conveniently applied without substantially altering the construction of the machine or in any way impairing the operation of the same.

Having thus described my invention what I claim as new and desire to secure by Letters Patent is:—

1. A grain saving attachment for thrashing machines comprising a casing of elongated formation having means whereby the same may be secured in an inclined position to the clean-out opening in the blower casing of a thrasher and having its lower portion provided with an outlet opening, the intermediate portion of the casing being provided with an inlet mouth adapted to be received within the clean-out opening of the thrasher, an endless conveyor arranged within the casing and having transverse strips to conduct the grain to the outlet opening, tensioning means to tension the conveyor whereby the transverse conductor strips are urged into air-tight engagement with the walls of the casing on opposite sides of the conveyor, and grate bars extending over the mouth of the casing.

2. A grain saving attachment for thrashing machines comprising a casing of elongated formation having means whereby the same may be secured in an inclined position to the blower casing of a thrasher and provided at its lower end with an outlet opening; the intermediate portion of the casing being provided with a mouth adapted to be snugly received within the clean-out opening of the thrasher casing, an endless conveyor arranged within the casing and having transverse strips to conduct grain to the outlet opening, rollers supporting the conveyor, and means whereby to adjust one of the rollers for tensioning the conveyor whereby the conveyor strips are urged into air-tight engagement with the inner walls of the casing on opposite sides of the conveyor, and a grate bar extending over said mouth.

LARS JOHAN OLSON.